(12) United States Patent
Chen

(10) Patent No.: US 12,376,621 B2
(45) Date of Patent: Aug. 5, 2025

(54) CIGAR CUTTER WITH ARRESTING MECHANISM

(71) Applicant: Shun-Fu Chen, New Taipei (TW)

(72) Inventor: Shun-Fu Chen, New Taipei (TW)

( * ) Notice: Subject to any disclaimer, the term of this patent is extended or adjusted under 35 U.S.C. 154(b) by 369 days.

(21) Appl. No.: 18/090,432

(22) Filed: Dec. 28, 2022

(65) Prior Publication Data
US 2023/0217993 A1 Jul. 13, 2023

(30) Foreign Application Priority Data

Jan. 10, 2022 (TW) .................................. 111100978

(51) Int. Cl.
*A24F 13/26* (2006.01)
(52) U.S. Cl.
CPC .................................... *A24F 13/26* (2013.01)
(58) Field of Classification Search
CPC ................................................. A24F 13/24–26
USPC ............................. 30/109, 113, 278; 131/248
See application file for complete search history.

(56) References Cited

U.S. PATENT DOCUMENTS

| | | | | |
|---|---|---|---|---|
| 5,992,022 A * | 11/1999 | Carrera Moya | ........ | A24F 13/24 30/113 |
| 7,770,295 B2 * | 8/2010 | Smith | ..................... | A24F 13/26 30/113 |
| 8,656,595 B2 * | 2/2014 | Wong | ..................... | A24F 13/26 30/109 |
| 9,055,769 B2 * | 6/2015 | Liao | ......................... | A24F 13/26 |
| 9,883,694 B2 * | 2/2018 | Almsberger | ............ | A24F 13/26 |
| 10,201,184 B1 * | 2/2019 | Fischer | ..................... | A24F 13/24 |
| 2009/0113718 A1 * | 5/2009 | Smith | ..................... | A24F 13/26 30/113 |
| 2009/0113719 A1 * | 5/2009 | Smith | ..................... | A24F 13/26 30/113 |
| 2009/0211589 A1 * | 8/2009 | Smith | ..................... | A24F 13/26 131/328 |
| 2011/0302785 A1 | 12/2011 | Chuan | | |
| 2013/0180113 A1 * | 7/2013 | Liao | ......................... | A24F 13/26 30/113 |

(Continued)

FOREIGN PATENT DOCUMENTS

| | | |
|---|---|---|
| CN | 207912037 U | 9/2018 |
| CN | 207978946 U * | 10/2018 |

(Continued)

*Primary Examiner* — Laura M Lee
(74) *Attorney, Agent, or Firm* — CIPO IP Group

(57) ABSTRACT

A cigar cutter with an arresting mechanism includes a pivotally connected arresting block and a guide track divided into a smooth groove, an abutting groove with an abutting block having a portion corresponding to a space between two opposite sides of the smooth groove, and a direction-changing groove having a shoulder opposite to the abutting block and two ends in communication with an end of the smooth groove and an end of the abutting groove, respectively. The arresting block can be moved in the guide track. When the cutter enters a closed state from an open state, the arresting block sequentially touches the abutting block and the shoulder, driving itself to rotate. A length between two opposite sides of a rotated arresting block is greater than two opposite sides of the smooth groove, keeping the arresting block from extending into the smooth groove and the cutter in the closed state.

13 Claims, 17 Drawing Sheets

(56) References Cited

U.S. PATENT DOCUMENTS

| | | | | |
|---|---|---|---|---|
| 2023/0217993 | A1* | 7/2023 | Chen | A24F 13/26 30/113 |
| 2023/0255261 | A1* | 8/2023 | Lo | A24F 13/26 30/113 |
| 2023/0329333 | A1* | 10/2023 | Yang | A24F 13/26 |

FOREIGN PATENT DOCUMENTS

| | | | | | |
|---|---|---|---|---|---|
| CN | 211960890 | U | * | 11/2020 | |
| CN | 214677547 | U | * | 11/2021 | |
| CN | 217161066 | U | * | 8/2022 | |
| CN | 217826729 | U | * | 11/2022 | |
| CN | 220453711 | U | * | 2/2024 | |
| DE | 4406006 | A1 | * | 6/1995 | A24F 13/26 |

* cited by examiner

CIGAR CUTTER WITH ARRESTING MECHANISM

CROSS-REFERENCE TO RELATED PATENT APPLICATION

This non-provisional application claims priority to and the benefit of, under 35 U.S.C. § 119(a), Taiwan Patent Application No. 111100978, filed Jan. 10, 2022 in Taiwan. The entire content of the above identified application is incorporated herein by reference.

FIELD

The present disclosure is related to a cigar cutter, and more particularly to a cigar cutter provided therein with a guide track and an arresting block that rotates when being moved in the guide track to change its length corresponding to two opposite sides of the guide track, so that the cigar cutter is positioned in a closed state.

BACKGROUND

Although expensive, cigars have been more and more popular thanks to the rise of the standard of living. A cigar generally has a closed end (i.e., the cap). Before smoking a cigar, therefore, a smoker must cut the cap of the cigar, forming the cap into a hollow shape so as to savor the taste and aroma of the cigar after the other end (i.e., the foot) of the cigar is lit.

Nowadays, a cigar cutter is typically used as the tool for cutting the cigar cap. While it is feasible for a cigar smoker to bite the cigar cap open directly with their teeth, doing so will not only fill the smoker's mouth with tobacco leaf pieces, but also make an irregular opening in the cap such that the evenness of burn, and consequently the smoothness of smoking and the taste and flavor, of the cigar are compromised during the smoking process. Only a cigar cutter can cut a proper, smooth opening in a cigar to bring out the flavor of the cigar to the fullest while preventing the wrapper of the cigar from being torn, which if happening will make the cigar surface visually unpleasant.

A common cigar cutter is briefly described below with reference to FIG. 1 and FIG. 2. The cigar cutter 1 includes a bottom casing 11, a top casing 13, a stationary handle 15, and a movable handle 17. The bottom casing 11 and the top casing 13 can be put together to form a housing 10 (as shown in FIG. 2), and are provided with corresponding through holes 110 and 130 respectively. The stationary handle 15 is provided at one end of the bottom casing 11 and is provided with a stationary blade 151. The stationary blade 151 can be received between the bottom casing 11 and the top casing 13 and has a cutting edge covering a portion of the through holes 110 and 130. The movable handle 17 is movably fitted into the opposite end of the bottom casing 11 and is provided with a movable blade 171. The movable handle 17 can be pulled or pushed by a user in order for the movable blade 171 to extend into or be moved out of the housing 10.

With continued reference to FIG. 1 and FIG. 2, the user can move the movable handle 17 in order to bring the cigar cutter 1 into either a closed state, i.e., a state in which the movable blade 171 completely covers the remaining portion of the through holes 110 and 130, or an open state, i.e., a state in which the movable blade 171 does not cover the remaining portion of the through holes 110 and 130 at all (as shown in FIG. 2). While the cigar cutter 1 is in the open state, the user can put the cap C of a cigar into the through holes 110 and 130 and then push the movable handle 17 in order to bring the cigar cutter 1 into the closed state and thereby cut a smooth opening in the cap C.

However, as the movable handle 17 does not have any positioning effect, changing the conventional cigar cutter 1 between the open state and the closed state depends entirely on the user's pulling or pushing the movable handle 17 manually. Such a operation method is evidently not convenient. Moreover, once the cigar cutter 1 is closed and in storage, a relatively strong collision may turn the cigar cutter 1 into the open state by accident. Should that happen, and if the user reaches for the cigar cutter 1 without noticing that it is in the open state, the user may put a finger into the through holes 110 and 130 inadvertently and thus suffer a cut in the finger by the movable blade 171. It is therefore an important issue to be addressed by developers and manufacturers in the cigar industry to improve the conventional cigar cutters so as to provide more convenient and safer user experience.

SUMMARY

In view of the astonishing purchasing power of cigar aficionados for cigar accessories, in which cigar cutters are undoubtedly indispensable everyday carry items, as a result of an extensive research and repeated experiments, the present disclosure provides a cigar cutter with an arresting mechanism as disclosed herein. This cigar cutter is intended, among others, to be more useful, easier to operate, and safer than its prior art counterparts, and draw consumers' attention.

One aspect of the present disclosure is directed to a cigar cutter with an arresting mechanism. The cigar cutter includes a main body, a blade holder, at least one elastic element and an arresting block. The main body is formed with at least one through hole and provided therein with at least one guide track. The guide track extends in a transverse direction and is divided at least into a smooth groove, a direction-changing groove, and an abutting groove. One end of the direction-changing groove is in communication with an end of the smooth groove, and the other end of the direction-changing groove is in communication with an end of the abutting groove. One side of the direction-changing groove has a shoulder. A side of the abutting groove that is opposite to the shoulder is formed with an abutting block. A portion of the abutting block corresponds to a space between two opposite sides of the smooth groove. The blade holder can be movably engaged to the main body, has one side that can be exposed from the main body and the other side that can extend into the main body, has at least one first blade located on the blade holder, and can be displaced along a direction inward of the main body so that the first blade covers the through hole and the cigar cutter enters a closed state. The at least one elastic element is located in the main body; has one end that can abut against the blade holder and the other end that can abut against the main body; can be compressed when the blade holder is displaced along the direction inward of the main body; and can push the blade holder away from the main body and the first blade away from covering the through hole so that the cigar cutter enters an open state. The arresting block has a first length between two first opposite sides of the arresting block that is equal to or less than a distance between the two opposite sides of the smooth groove, and a second length greater than the distance between the two opposite sides of the smooth groove and defined as a maximum distance between two second opposite sides of the arresting block that are other than the two first opposite sides. The arresting block can be pivotally connected to the blade holder; be extended into the guide track; move in the guide track along with the displacement of the blade holder; when the cigar cutter is in the open state, be located in the smooth groove with the two first opposite sides of the arresting block corresponding to the two opposite sides of the smooth groove, respectively; when the blade holder is pressed and the elastic element is compressed, move from the smooth groove along a direction toward the abutting groove until touching the abutting block; rotate in a rotating direction in response to touching the abutting block; when the blade holder is not pressed and the blade holder is moved by a restoring force of the elastic element, move along a direction from the abutting groove toward the direction-changing groove until touching the shoulder; and in response to touching the shoulder, rotate in the rotating direction to enable the two second opposite sides of the arresting block to correspond to two opposite sides of the direction-changing groove respectively and to keep the two second opposite sides of the arresting block from being extended into the smooth groove, so that the cigar cutter remains in the closed state. As a user can keep the cigar cutter in its current state (e.g., an open or closed state) simply by pressing the blade holder, the safety of storage, as well as the ease of use, of the cigar cutter is effectively enhanced.

In certain embodiments, the arresting block can further: when the cigar cutter is in the closed state, the blade holder is pressed, and the elastic element is compressed, move along a direction from the direction-changing groove toward the abutting groove until touching the abutting block; rotate in the rotating direction in response to touching the abutting block; when the blade holder is not pressed and the blade holder is moved by a restoring force of the elastic element, move along the direction from the abutting groove toward the direction-changing groove until touching the shoulder; and in response to touching the shoulder, rotate in the rotating direction to enable the two first opposite sides of the arresting block to correspond to the two opposite sides of the direction-changing groove respectively and to extend into the smooth groove, so that the cigar cutter is in the open state.

In certain embodiments, each of the two second opposite sides of the arresting block is inwardly formed with a recess.

In certain embodiments, the rotating direction is clockwise.

In certain embodiments, a longitudinal distance between the two opposite sides of the direction-changing groove is greater than a longitudinal distance between the two opposite sides of the smooth groove.

In certain embodiments, the main body includes a housing, a front cover and a rear cover. The housing is formed on one side thereof with at least one receiving opening allowing a side of the blade holder and the first blade to extend therethrough into the main body. The guide track is provided within the housing. The front cover can be mounted on the front side of the housing and formed with at least one front through hole. The rear cover can be mounted on the rear side of the housing and formed with at least one rear through hole. The front through hole and the rear through hole form in the through hole.

In certain embodiments, the cigar cutter further includes a second blade disposed in the main body. The second blade corresponds in position to the first blade.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
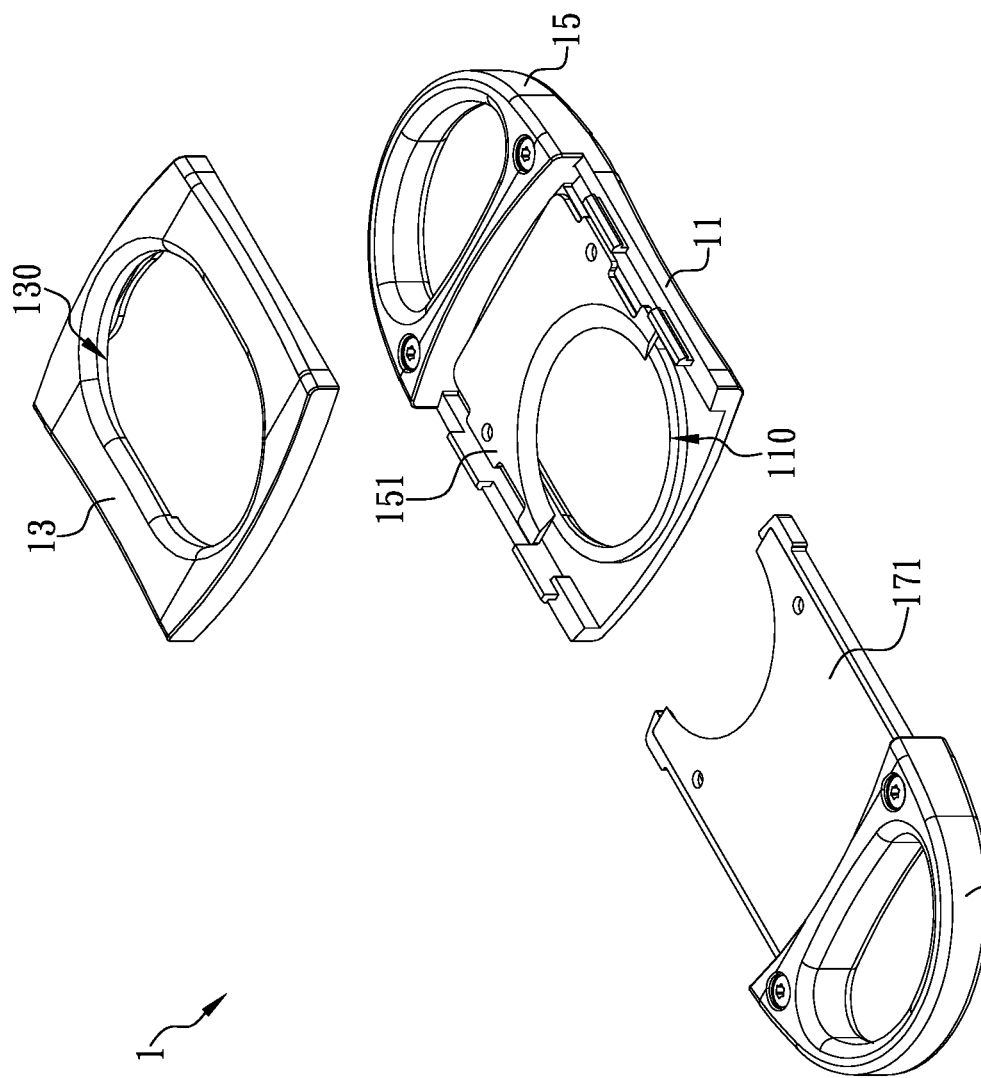
FIG. 1 is an exploded view of a conventional cigar cutter.
Figure 2:
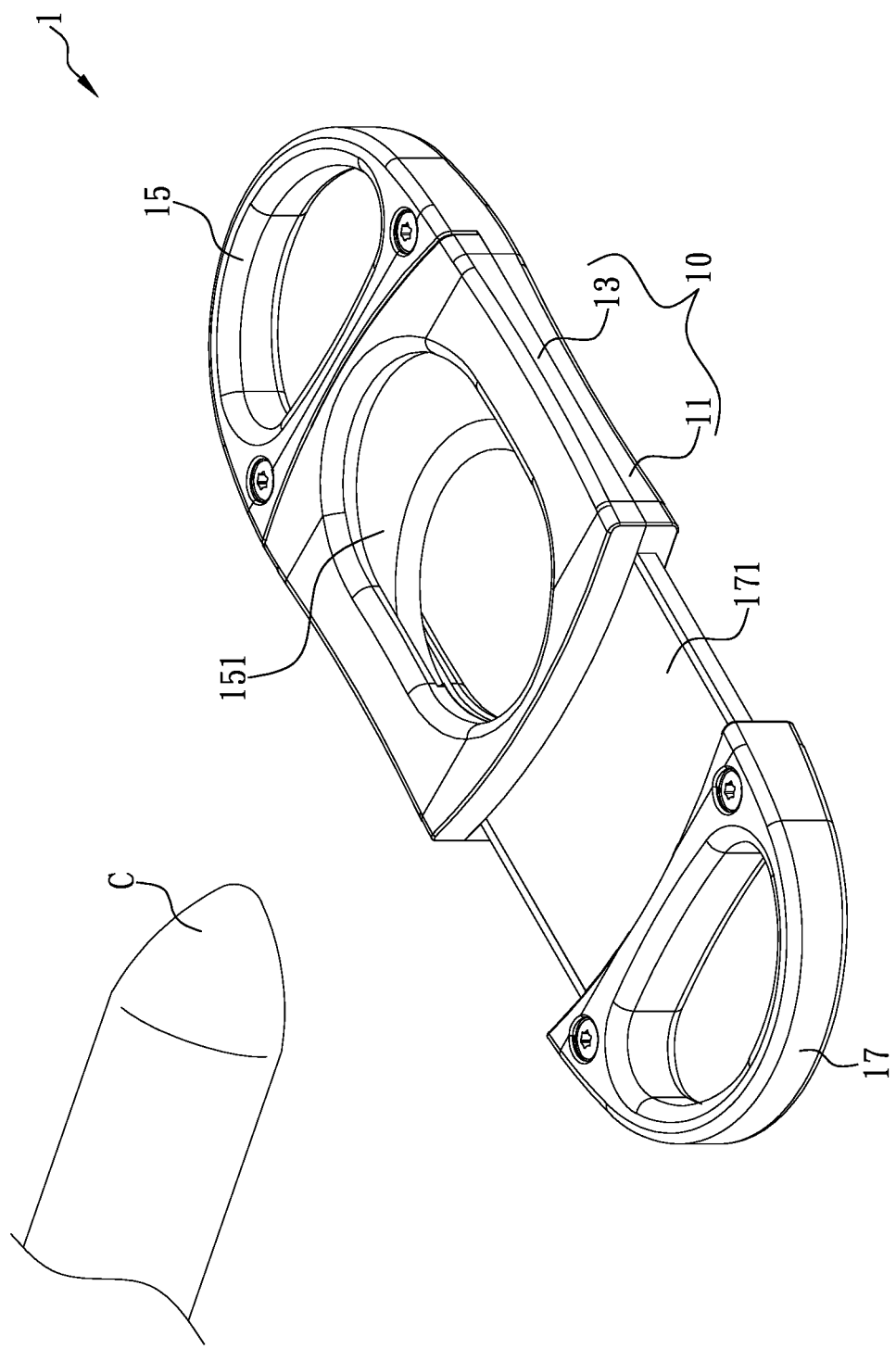
FIG. 2 is an assembled view of the conventional cigar cutter.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

Figure 3:
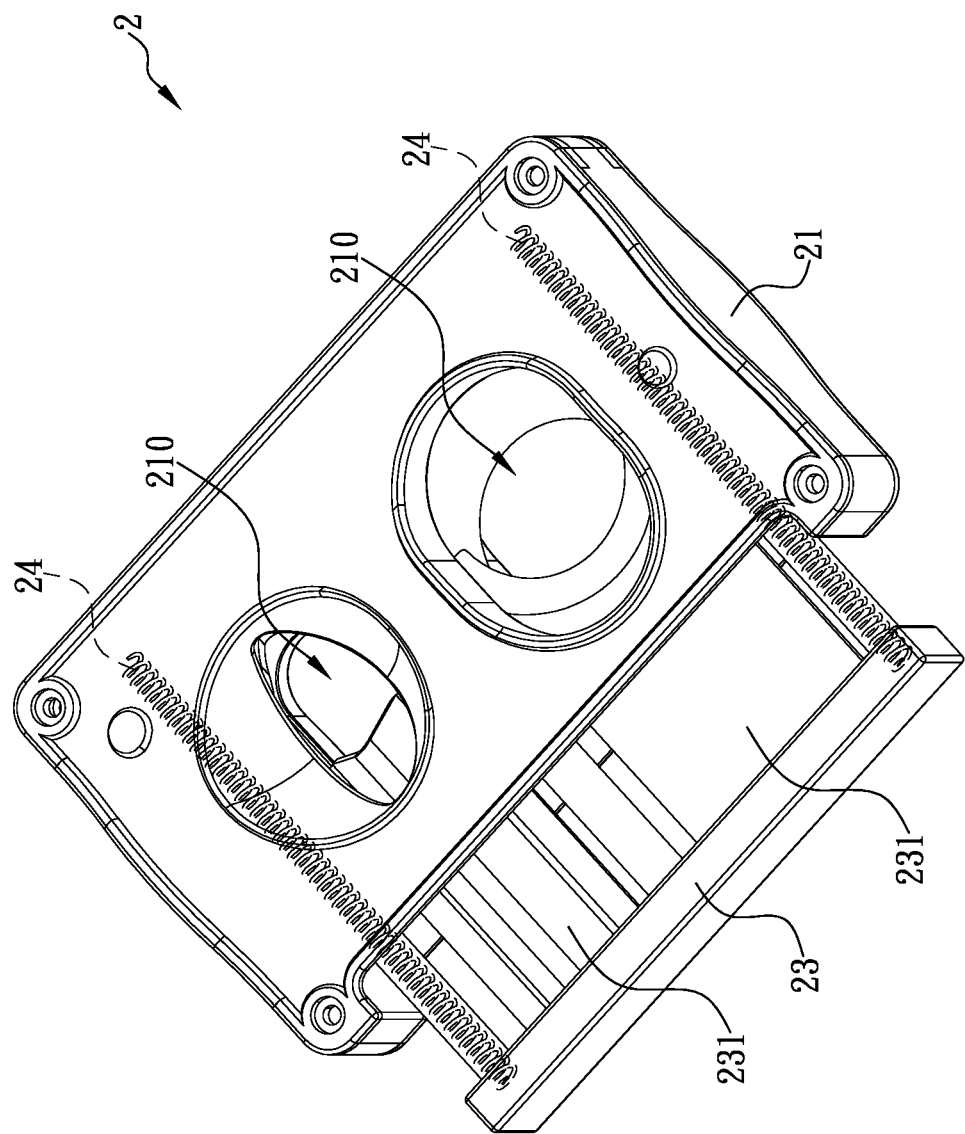
FIG. 3 is a schematic diagram of a cigar cutter in an open state according to certain embodiments of the present disclosure.
Figure 4:
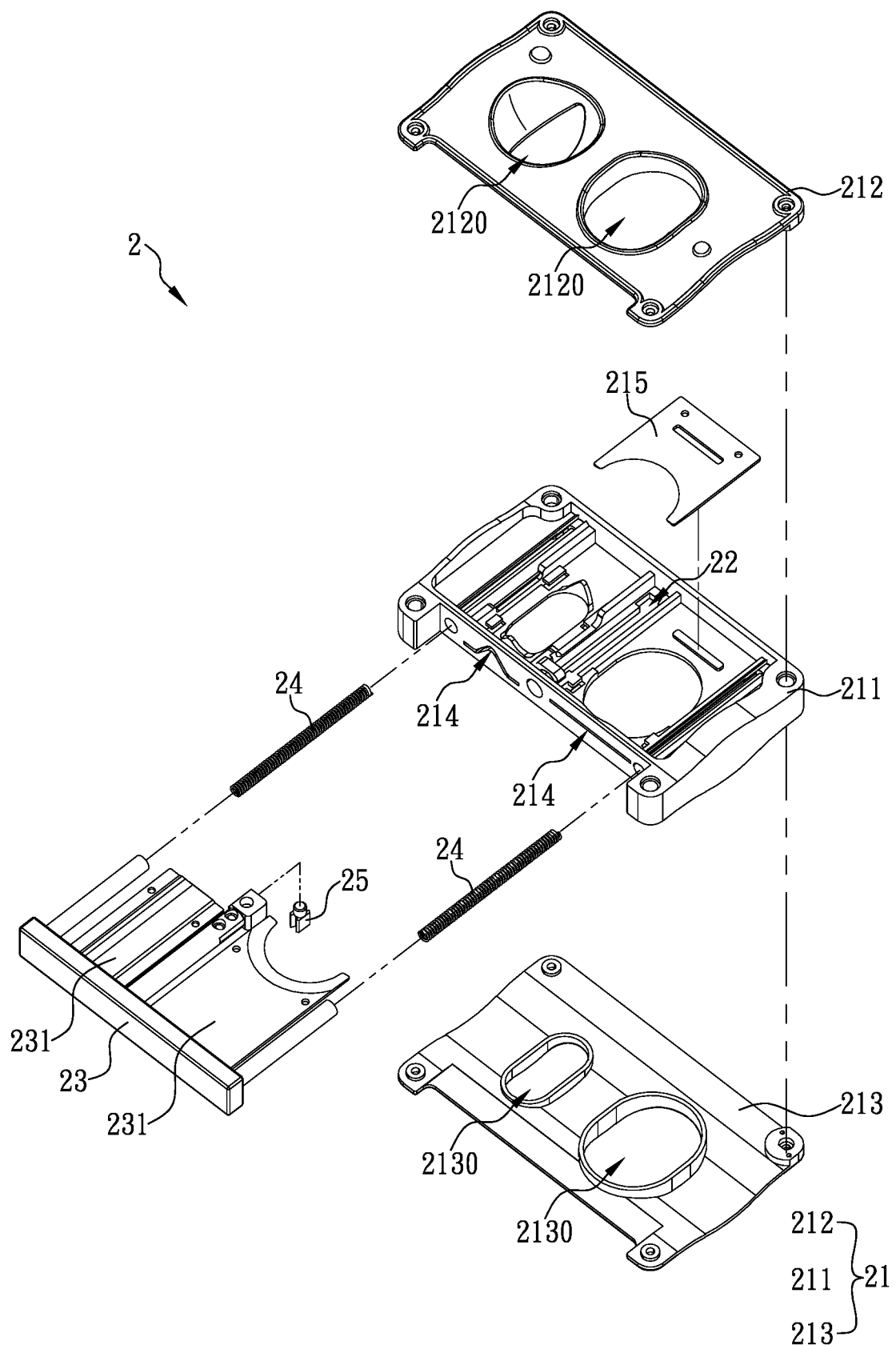
FIG. 4 is an exploded view of the cigar cutter according to certain embodiments of the present disclosure.

The present disclosure provides a cigar cutter with an arresting mechanism. Referring to FIG. 3 and FIG. 4, the cigar cutter 2 includes a main body 21, a blade holder 23, at least one elastic element 24, and an arresting block 25. To facilitate description, the front side of a component is defined as the side of FIG. 3 that faces a viewer, the rear side of a component is defined as the side of FIG. 3 that faces away from the viewer, the top side of a component is defined as the side facing the upper left corner of FIG. 3, the bottom side as the side facing the lower right corner of FIG. 3, the left side as the side facing the lower left corner of FIG. 3, and the right side as the side facing the upper right corner of FIG. 3. The main body 21 is formed with at least one through hole 210, and the at least one through hole 210 is open on the front and rear sides of the main body 21. In certain embodiments, the cigar cutter 2 has two through holes 210 that are different in size and shape. One of the through holes 210 (e.g., the through hole 210 in FIG. 3 that is closer to the top edge of the drawing) has a smaller hole diameter, does not allow passage of a cigar cap, but can be used to cut a substantially V-shaped groove in a cigar. The other through hole 210 (e.g., the through hole 210 in FIG. 3 that is closer to the bottom edge of the drawing) has a larger hole diameter and allows passage of a cigar cap so that the cigar cap can be clipped off (cut off) directly. However, the present disclosure is not limited thereto, and in other embodiments, the number, shape, location and/or size of the through hole(s) 210 can be adjusted by a manufacturer according to product requirements.

In certain embodiments, with continued reference to FIG. 3 and FIG. 4, the main body 21 includes a housing 211, a front cover 212, and a rear cover 213. One side of the housing 211 is formed with at least one receiving opening 214, for example, the left side as shown in FIG. 3. The at least one receiving opening 214 is in communication with the interior space of the housing 211. The front cover 212 is configured to be mounted on the front side of the housing 211 and is formed with at least one front through hole 2120. The rear cover 213 is configured to be mounted on the rear side of the housing 211 and is formed with at least one rear through hole 2130. Once the front cover 212 and the rear cover 213 are fixed on the housing 211, each front through hole 2120 and a rear through hole 2130 corresponding thereto are in communication with each other to form a corresponding through hole 210. In other words, a user can pass at least a portion of a cigar through corresponding front and rear through holes 2120 and 2130. However, the present disclosure is not limited thereto, and in certain embodiments, the structure, appearance, and/or the number of components, of the main body 21 can be adjusted by a manufacturer according to product requirements, for example, the front cover 212 and the rear cover 213 are integrally formed with each other.

Figure 5:
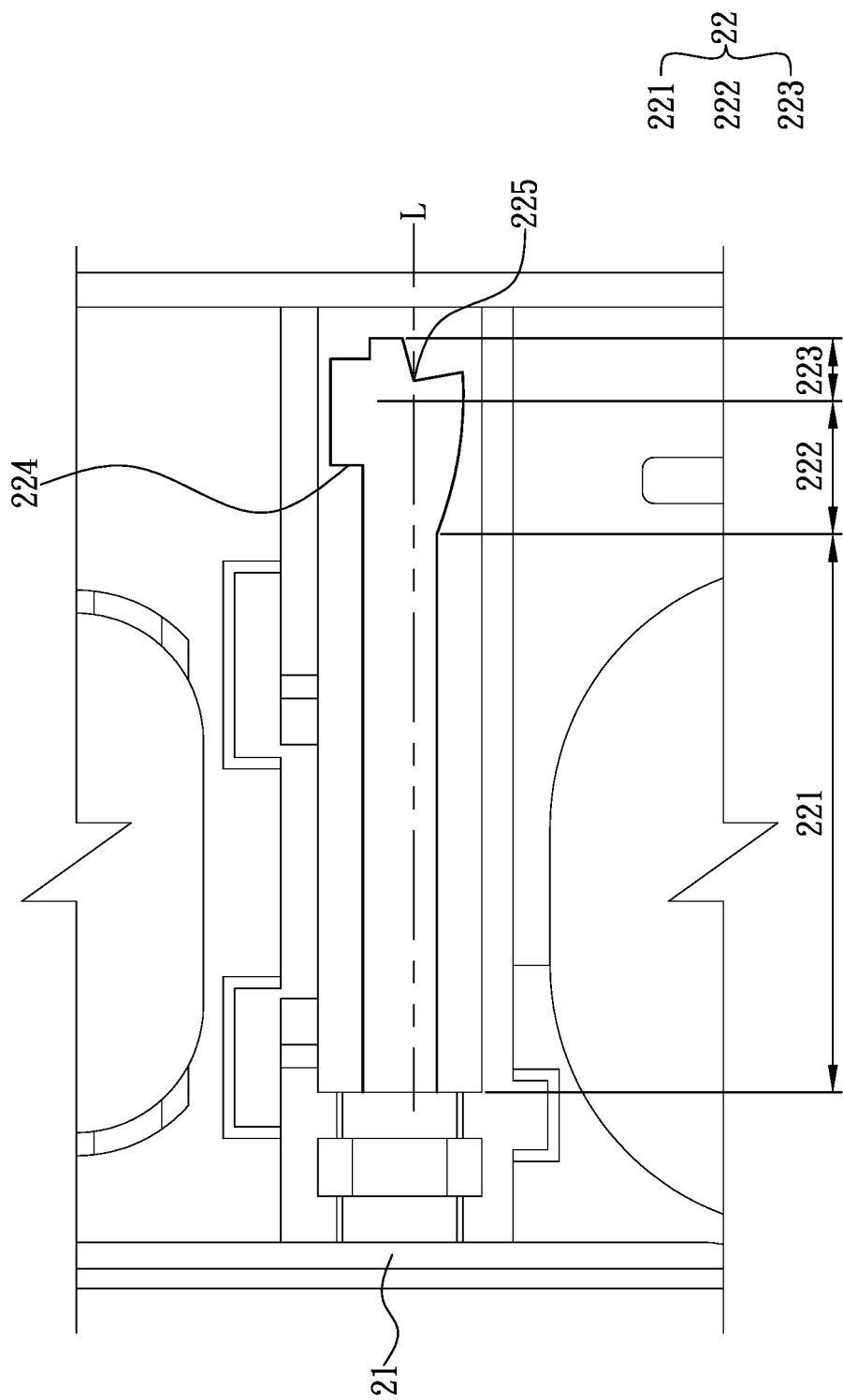
FIG. 5 is a schematic diagram of a guide track according to certain embodiments of the present disclosure.

Referring to FIG. 4 and FIG. 5, the housing 211 can be provided therein with at least one guide track 22. The guide track 22 extends in a transverse direction (e.g., the left-right direction shown in FIG. 5) and is divided at least into a smooth groove 221, a direction-changing groove 222, and an abutting groove 223. The smooth groove 221 has a uniform or substantially uniform width in the longitudinal direction (e.g., the top-bottom direction shown in FIG. 5). One end (e.g., the left end shown in FIG. 5) of the direction-changing groove 222 is in communication with a corresponding end (e.g., the right end shown in FIG. 5) of the smooth groove 221, and the other end (e.g., the right end shown in FIG. 5) of the direction-changing groove 222 is in communication with a corresponding end (e.g., the left end shown in FIG. 5) of the abutting groove 223. One side of the direction-changing groove 222 has a shoulder 224 (e.g., the upper side as shown in FIG. 5). When viewed from the viewing angle of FIG. 5, a part of the upper inner wall surface of the direction-changing groove 222 that is to the right of the shoulder 224 is closer to the top edge of the drawing than a part of the upper inner wall surface of the direction-changing groove 222 that is to the left of the shoulder 224 is, and the lower inner wall surface of the direction-changing groove 222 is closer to the bottom edge of the drawing than the lower inner wall surface of the smooth groove 221 is. Moreover, the side of the abutting groove 223 that is opposite to the shoulder 224 (e.g., the lower side of the abutting groove 223 as shown in FIG. 5) is formed with an abutting block 225. A portion of the abutting block 225 corresponds to a space between the two opposite sides of the smooth groove 221; in other words, an extension line L projected from a wall surface portion of the abutting block 225 will lie between the upper and lower sides of the smooth groove 221 as shown in FIG. 5.

Figure 6:
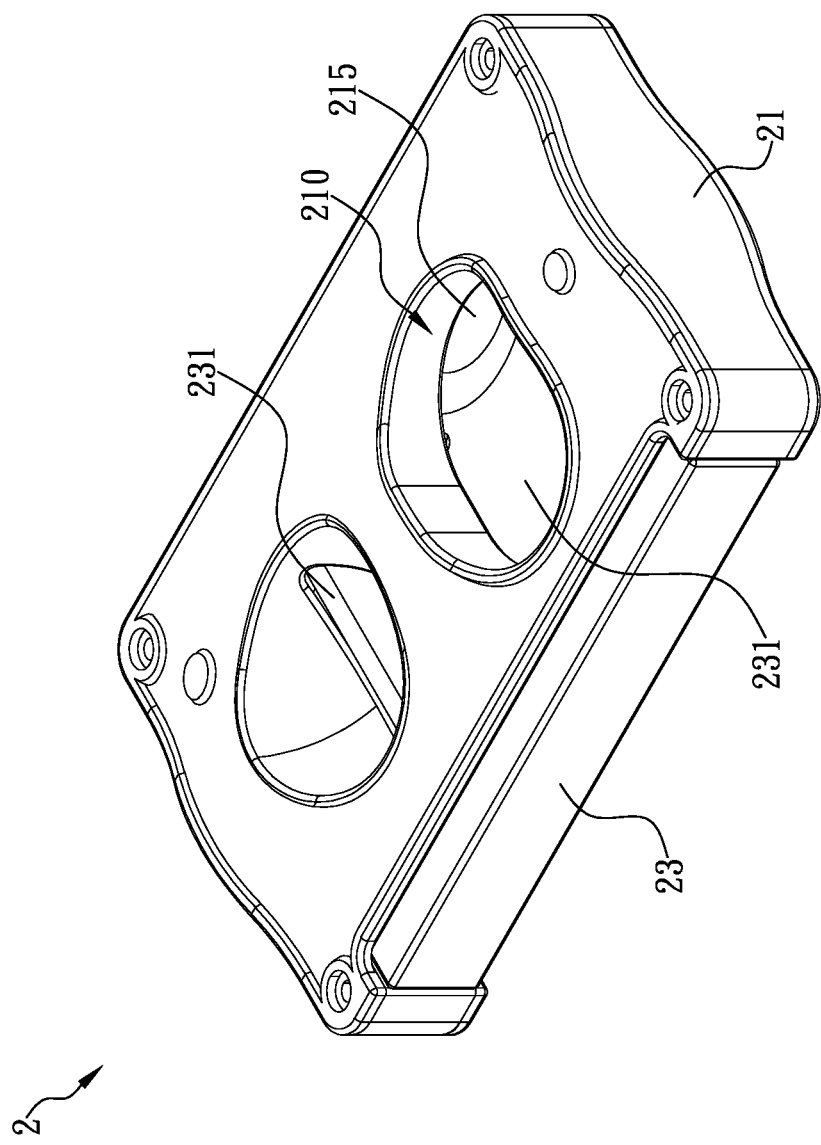
FIG. 6 is a schematic diagram of a cigar cutter in a closed state according to certain embodiments of the present disclosure.

Referring to FIG. 3 and FIG. 4, the blade holder 23 can be movably engaged to the main body 21, with one side (e.g., the left side as shown in FIG. 3) configured to be exposed from the main body 21, and the other side (e.g., the right side as shown in FIG. 3, hereinafter referred to as the second side) configured to extend into the main body 21. The elastic element 24 is provided between the blade holder 23 and the main body 21. One end of the elastic element 24 is configured to abut against the blade holder 23, and the other end of the elastic element 24 is configured to abut against the main body 21. At least one blade 231 can be located on the blade holder 23, whose shape can be changed according to product requirements. In certain embodiments, as shown in FIG. 4, two differently shaped blades 231 are provided. To enhance the cigar cutting effect, the main body 21 can be additionally disposed therein with another blade 215 (but not limited thereto), and the blade 215 corresponds in position to a blade 231 (e.g., the blade 231 in FIG. 4 that is closer to the bottom edge of the drawing). In certain embodiments, the second side of the blade holder 23 and the blade(s) 231 are configured to extend into the main body 21 through the receiving opening(s) 214. When the blade holder 23 is pressed by a user's finger and thus displaced along a direction inward of the main body 21, the elastic element 24 is compressed and stores a restoring force, and the blade holder 23 can be so pressed until the blade(s) 231 cover the through hole(s) 210, i.e., until the cigar cutter 2 enters a closed state (as shown in FIG. 6). When the blade holder 23 is no longer pressed, the blade holder 23 is pushed outward (i.e., away from the main body 21) by the restoring force of the elastic element 24 until the through hole(s) 210 are no longer covered by the blade(s) 231, i.e., until the cigar cutter 2 is in an open state (as shown in FIG. 3). It is noted that the reference of "the blade 231 covering the through hole 210" supra is defined as at least a part of the cigar being unable to extend through the through hole 210 and as a result the blade 231 cannot cut the cigar off or cut a groove on the cigar, and the reference of "the blade 231 not covering the through hole 210" supra is defined as the state of the through hole 210 being able to allow at least a part of the cigar to extend therethrough and as a result the blade 231 can cut the cigar off or cut a groove on the cigar. In other words, when the cigar cutter 2 is in a closed state, a user cannot use the cigar cutter to cut a cigar, whereas when the cigar cutter 2 is in an open state, a user can use the cigar cutter to cut a cigar.

Figure 7A:
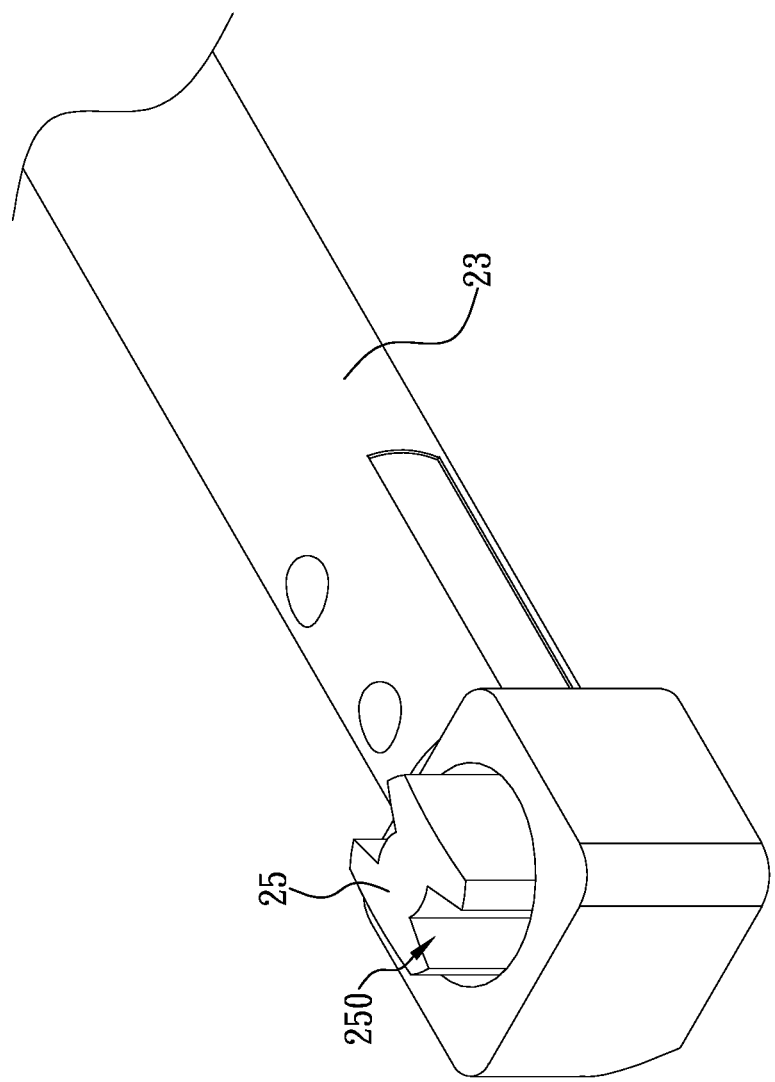
FIG. 7A is a perspective view of a part of an arresting block-blade holder assembly according to certain embodiments of the present disclosure.
Figure 7B:
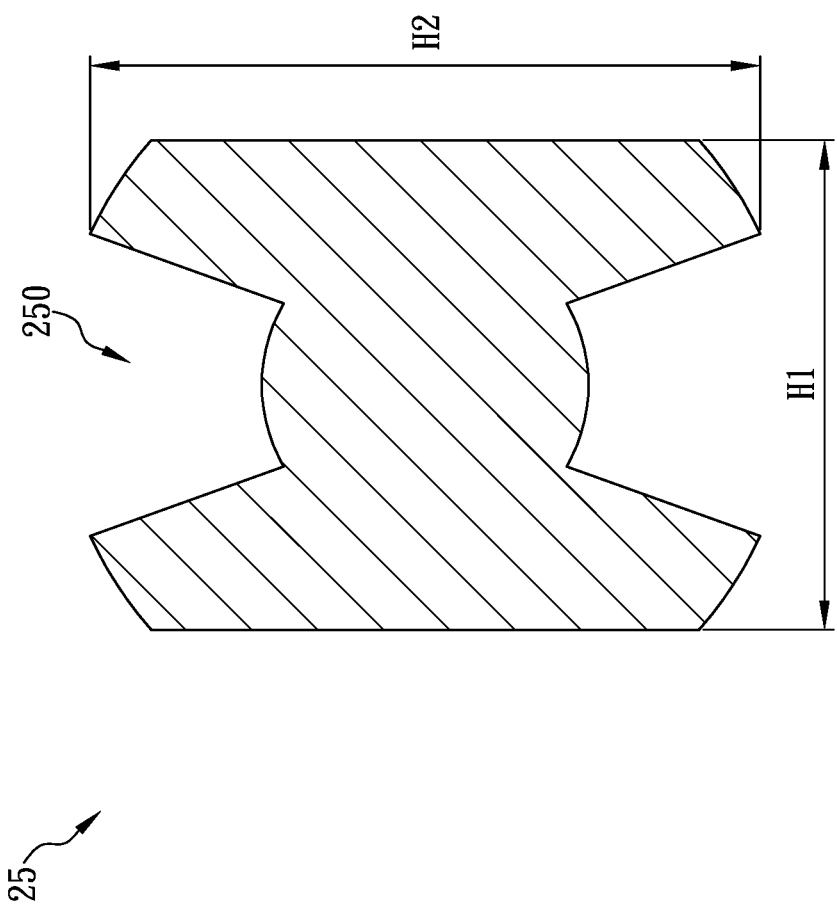
FIG. 7B is a cross-sectional view of an arresting block according to certain embodiments of the present disclosure.

Referring to FIG. 4, FIG. 7A and FIG. 7B, the arresting block 25 is pivotally connected to the blade holder 23 and is configured to rotate about a central axis of itself when subjected to an external force or the interference of an external object. Once the blade holder 23 is mounted in the main body 21, the arresting block 25 extends into the guide track 22 and can be displaced along with the blade holder 23 and thus moved in the guide track 22. The arresting block 25 has a first length H1 (see FIG. 7B) defined as the distance between two opposite sides (hereinafter referred to as the two first opposite sides) of the arresting block 25, and the first length H1 is equal to or less than the distance between the two opposite sides (e.g., the upper and lower sides shown in FIG. 5) of the smooth groove 221. The arresting block 25 further has a second length H2 (see FIG. 7B) defined as the maximum distance between two other opposite sides (hereinafter referred to as the two second opposite sides) of the arresting block 25, and the second length H2 is greater than the distance between the two opposite sides (e.g., the upper and lower sides shown in FIG. 5) of the smooth groove 221. In addition, to allow the arresting block 25 to better rotate and to have a lower change of being stuck in the process described infra, in certain embodiments, each of the two second opposite sides can be inwardly formed with a recess 250. However, the present disclosure is not limited thereto.

Figure 8A:
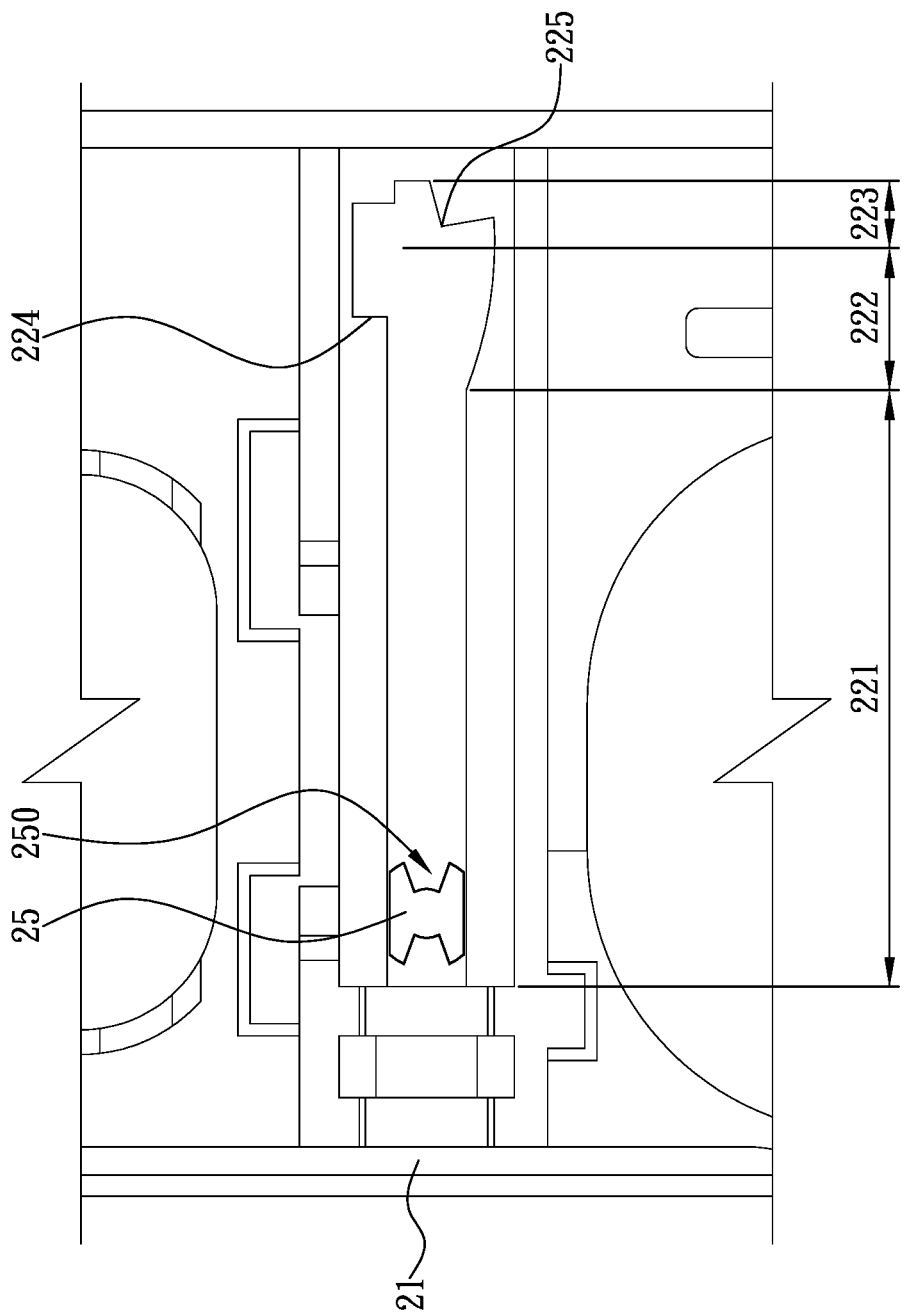
FIGS. 8A-8E are schematic diagrams showing the process of an arresting block being moved in a guide track when a cigar cutter enters into a closed state from an open state according to certain embodiments of the present disclosure.
Figure 8B:
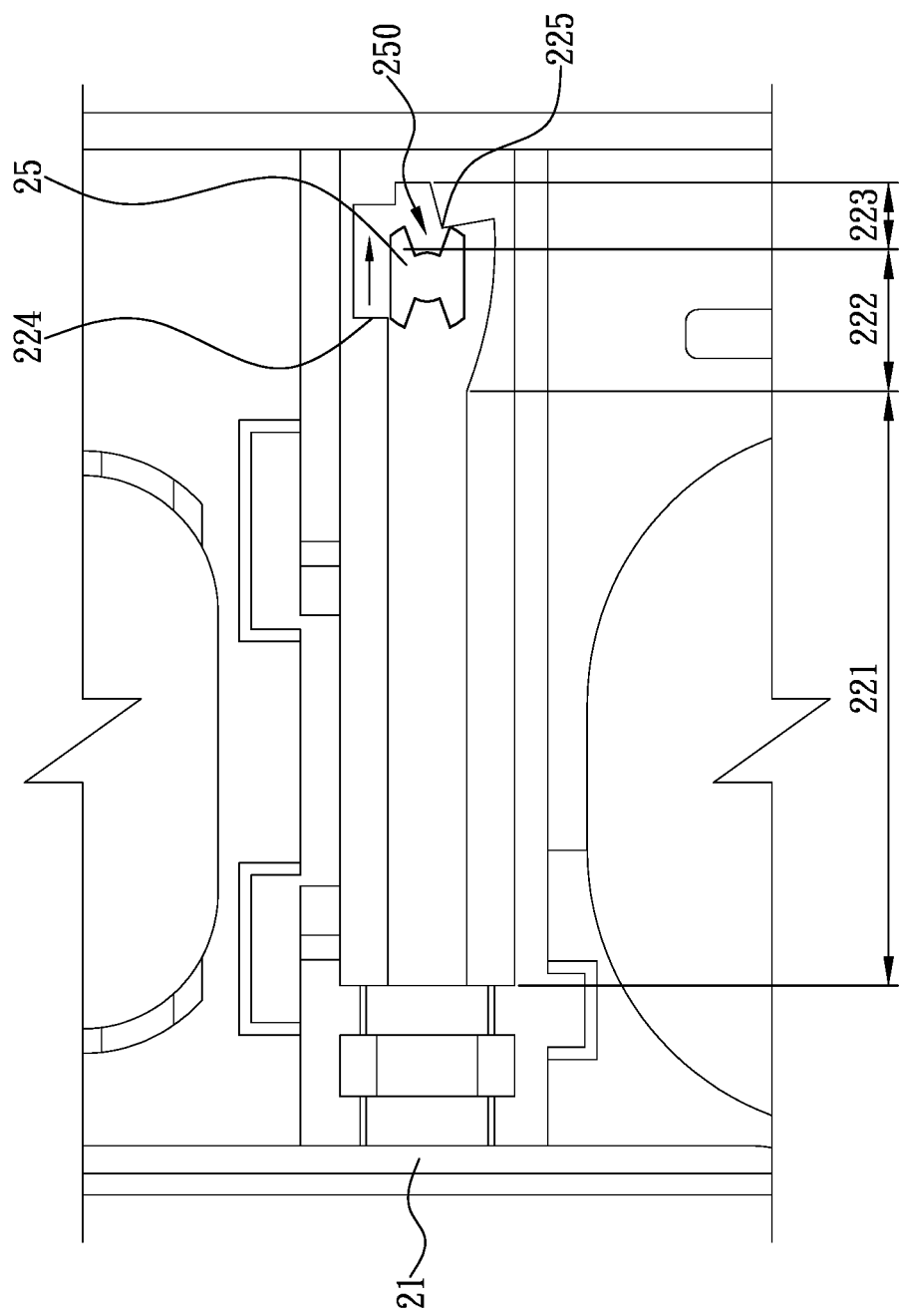
Figure 8C:
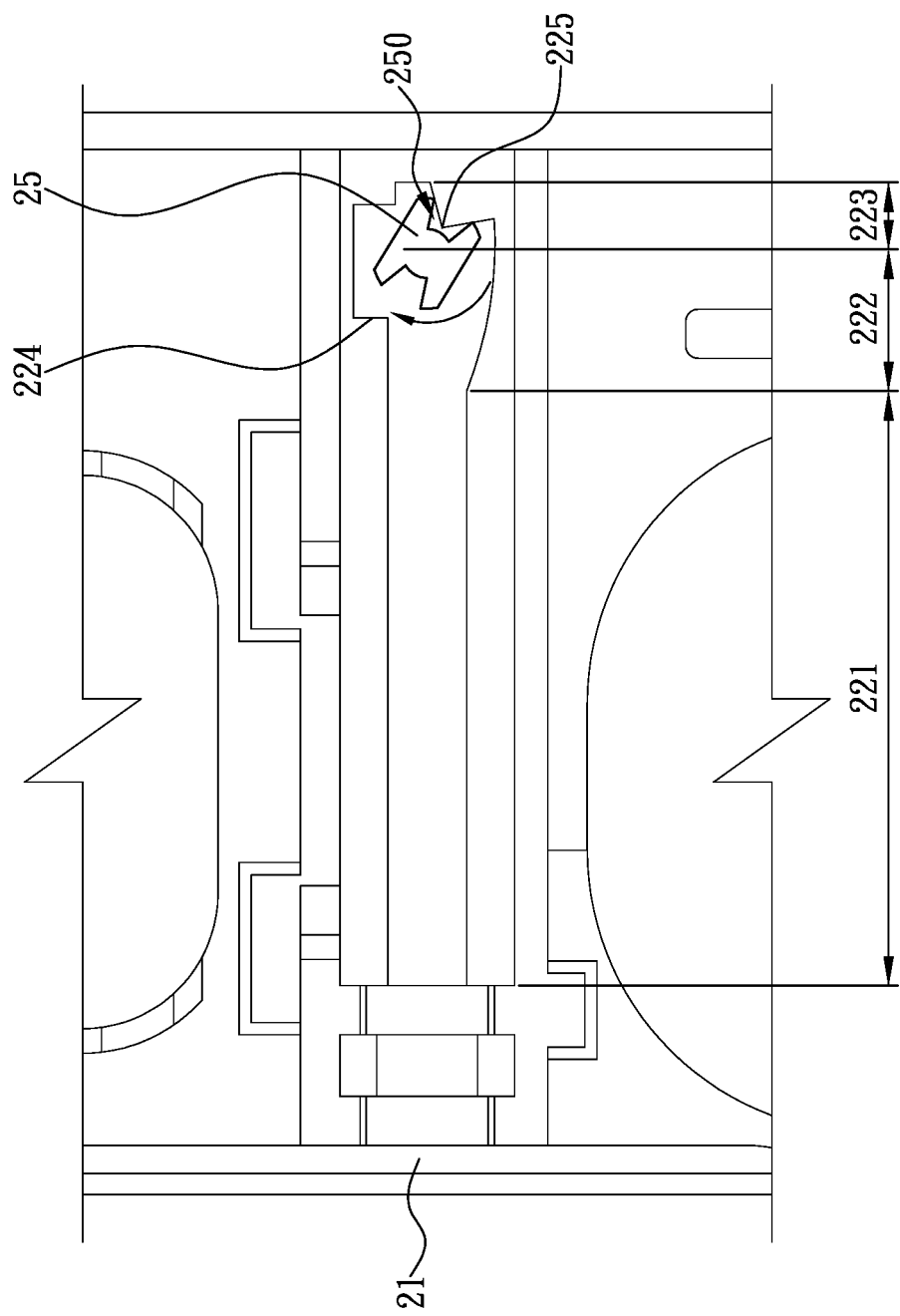

The process of the arresting block 25 being moved in the guide track 22 and allowing the cigar cutter 2 according to the present disclosure to stay in the closed state is detailed as follows. Referring to FIG. 8A, when the cigar cutter 2 is in the open state, the arresting block 25 is in the smooth groove 221, with the two first opposite sides of the arresting block 25 corresponding to the two opposite sides of the smooth groove 221 respectively, and therefore the blade holder 23 can be moved outward by the force of the elastic element 24 (see FIG. 3). When subsequently pressed by the user, the blade holder 23 is moved inward. As a result, the elastic element 24 is compressed, and the arresting block 25 is moved from the smooth groove 221 toward the abutting groove 223, as shown in FIG. 8B. After moving from the smooth groove 221 through the direction-changing groove 222 into the abutting groove 223, the arresting block 25 touches, and is thus obstructed by, the abutting block 225 and therefore begins to rotate in a rotating direction (e.g., clockwise). In certain embodiments, as shown in FIG. 8C, a portion of the abutting block 225 extends into a recess 250 of the arresting block 25 in order for the arresting block 25 to be rotated in the rotating direction.

Figure 8D:
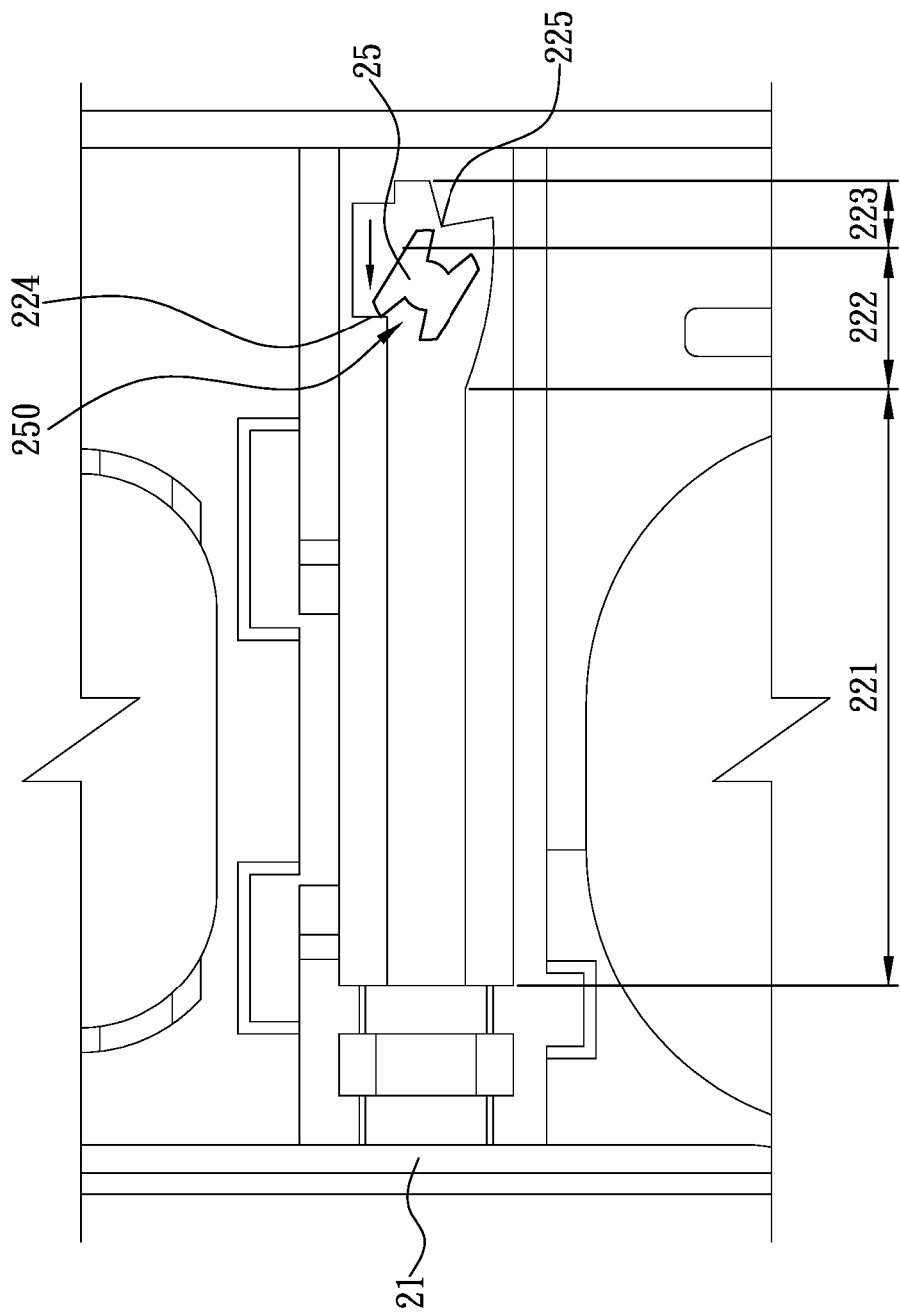
Figure 8E:
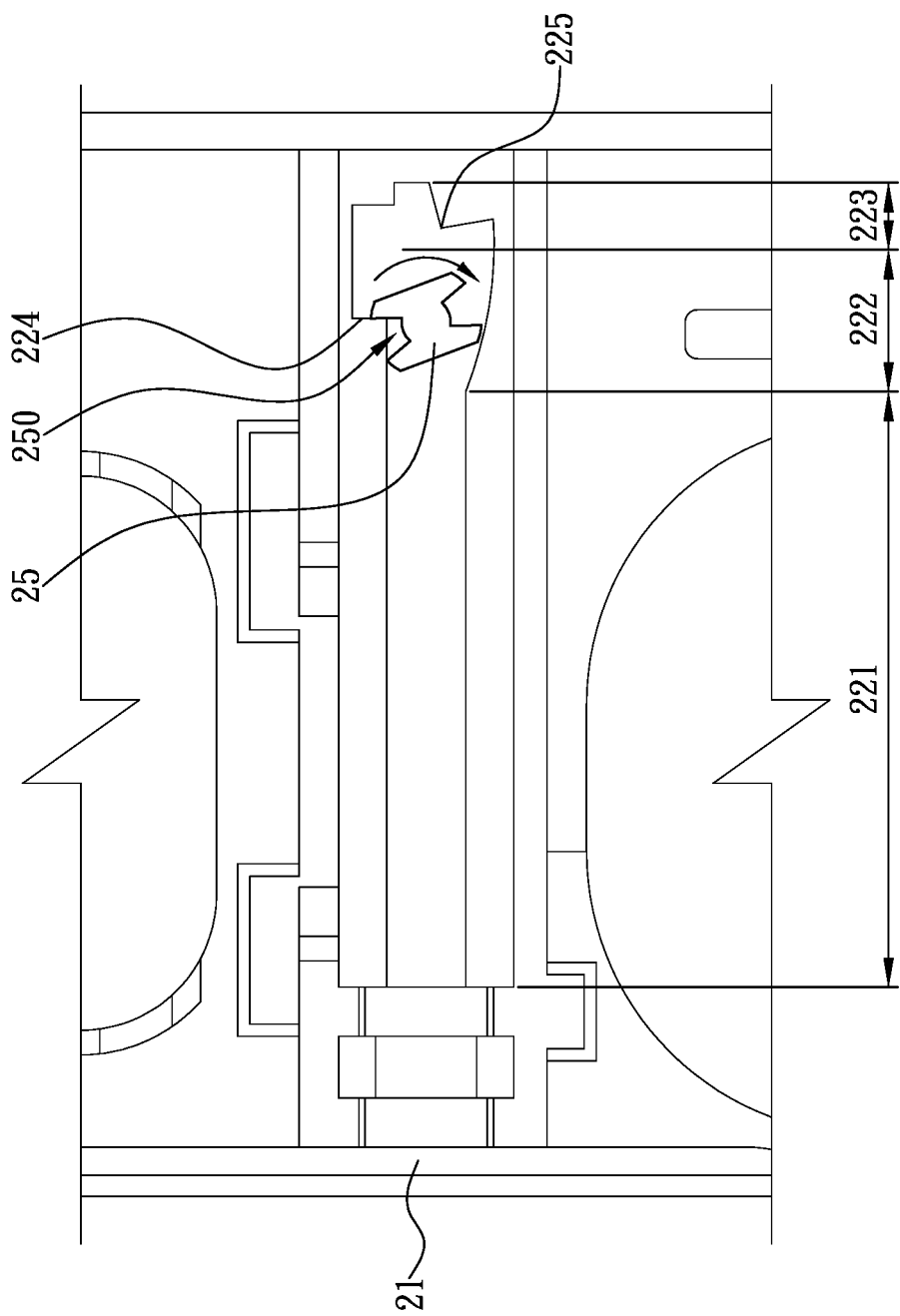

When the arresting block 25 touches the abutting block 225, referring to FIG. 4 and FIG. 6, the through holes 210 are covered by the blades 231 respectively. When the user releases their finger such that the blade holder 23 is no longer pressed, the blade holder 23 is moved outward by the restoring force of the elastic element 24. During the process, the arresting block 25 is moved from the abutting groove 223 toward the direction-changing groove 222 (as shown in FIG. 8D) and thus separates from the abutting block 225. As the arresting block 25 has been rotated (for the first time) after touching the abutting block 225, the arresting block 25 is now moved toward the direction-changing groove 222 in an inclined position (with respect to the position of the arresting block 25 in FIG. 8A). The arresting block 25 will touch, and be obstructed by, the shoulder 224 while being so moved and therefore rotate in the rotating direction (e.g., clockwise) again (as shown in FIG. 8E). After the arresting block 25 has been rotated twice, the two second opposite sides of the arresting block 25 correspond to the two opposite sides (e.g., the upper and lower sides shown in FIG. 5) of the direction-changing groove 222 respectively. As the second length H2 defined by the two second opposite sides of the arresting block 25 is greater than the distance between the two opposite sides of the smooth groove 221, the arresting block 25 cannot extend into the smooth groove 221 and thus keeps the cigar cutter 2 in the closed state.

Figure 9A:
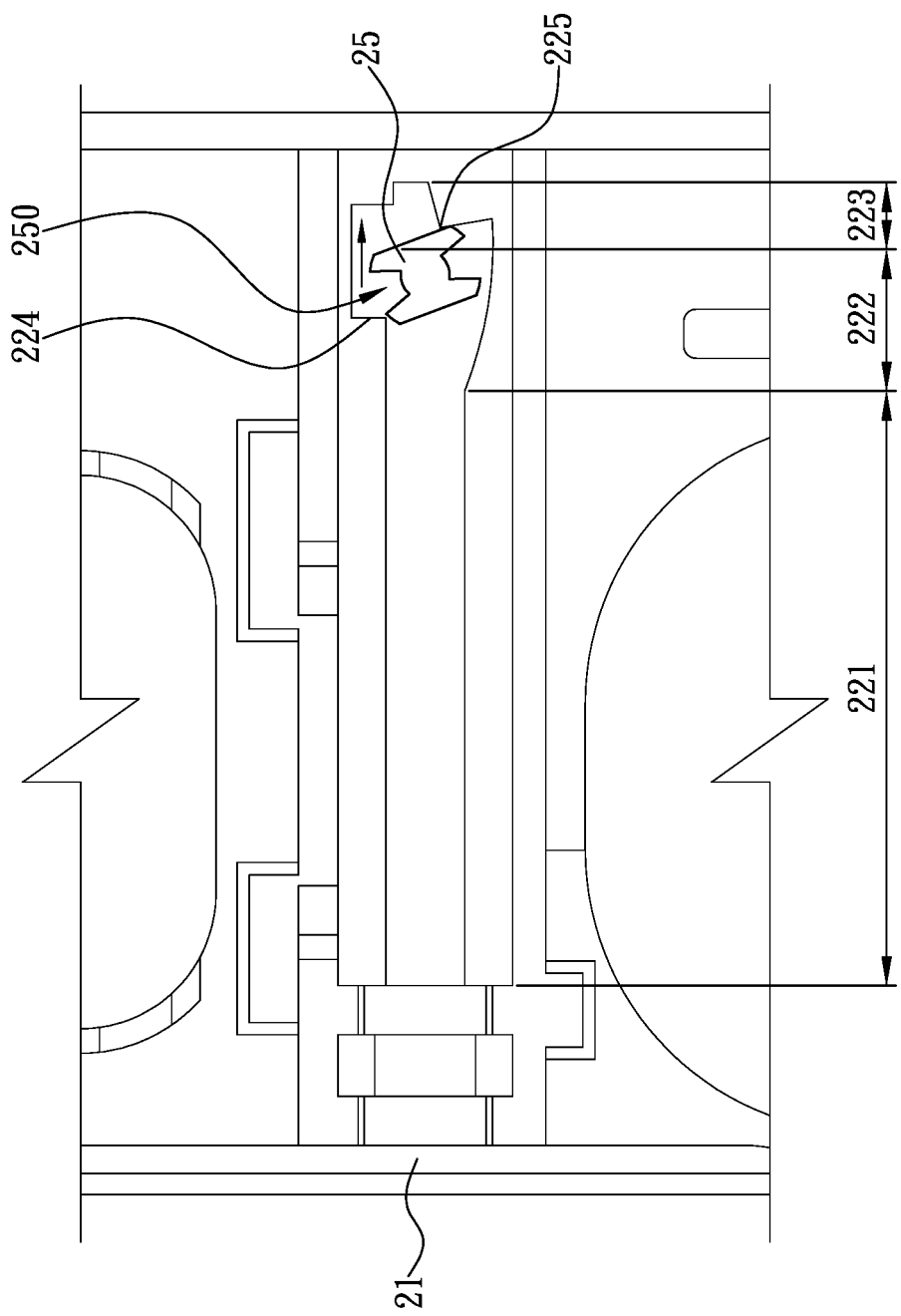
FIGS. 9A-9D are schematic diagrams showing the process of an arresting block being moved in a guide track when a cigar cutter enters into an open state from a closed state according to certain embodiments of the present disclosure.
Figure 9B:
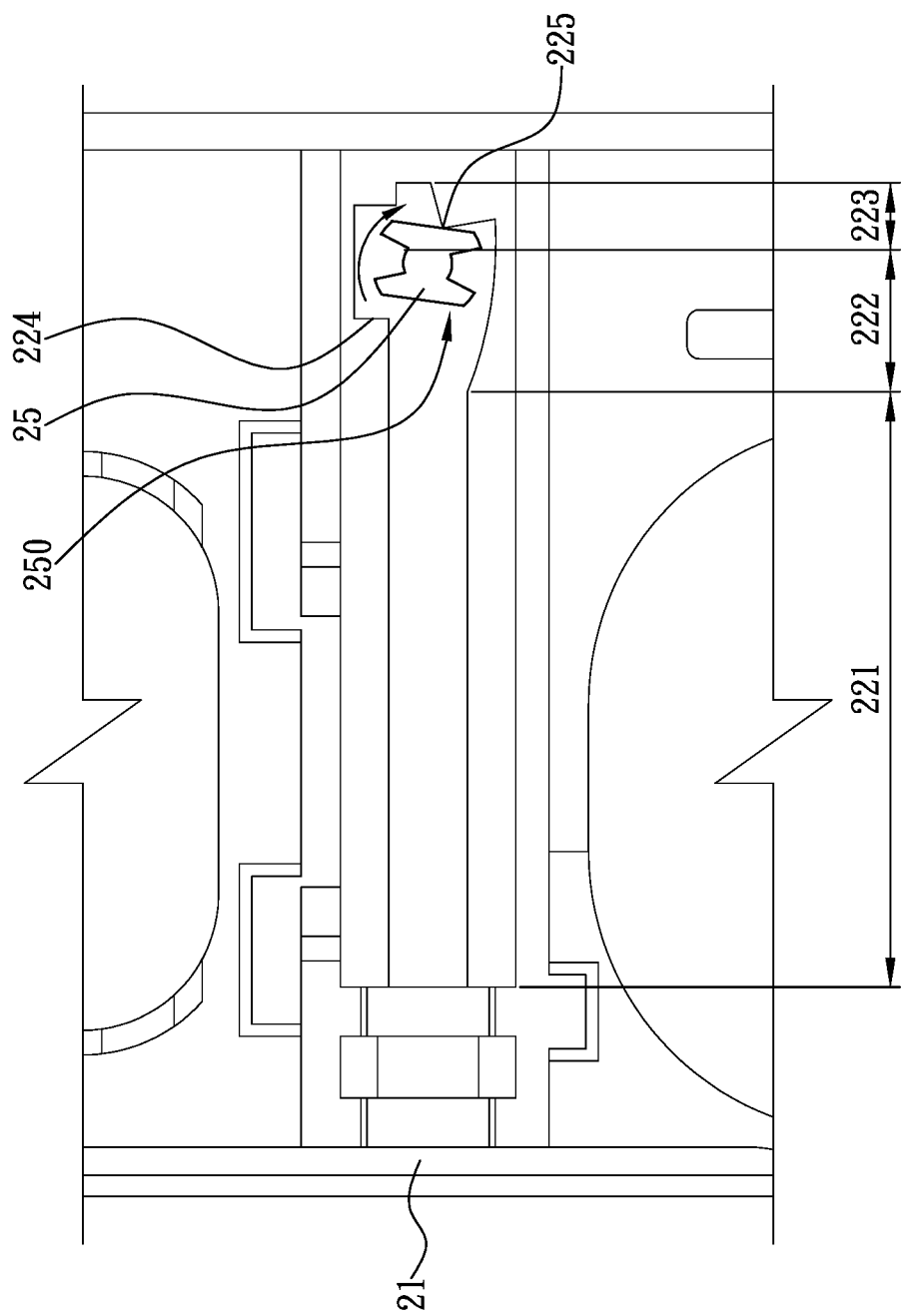
Figure 9C:
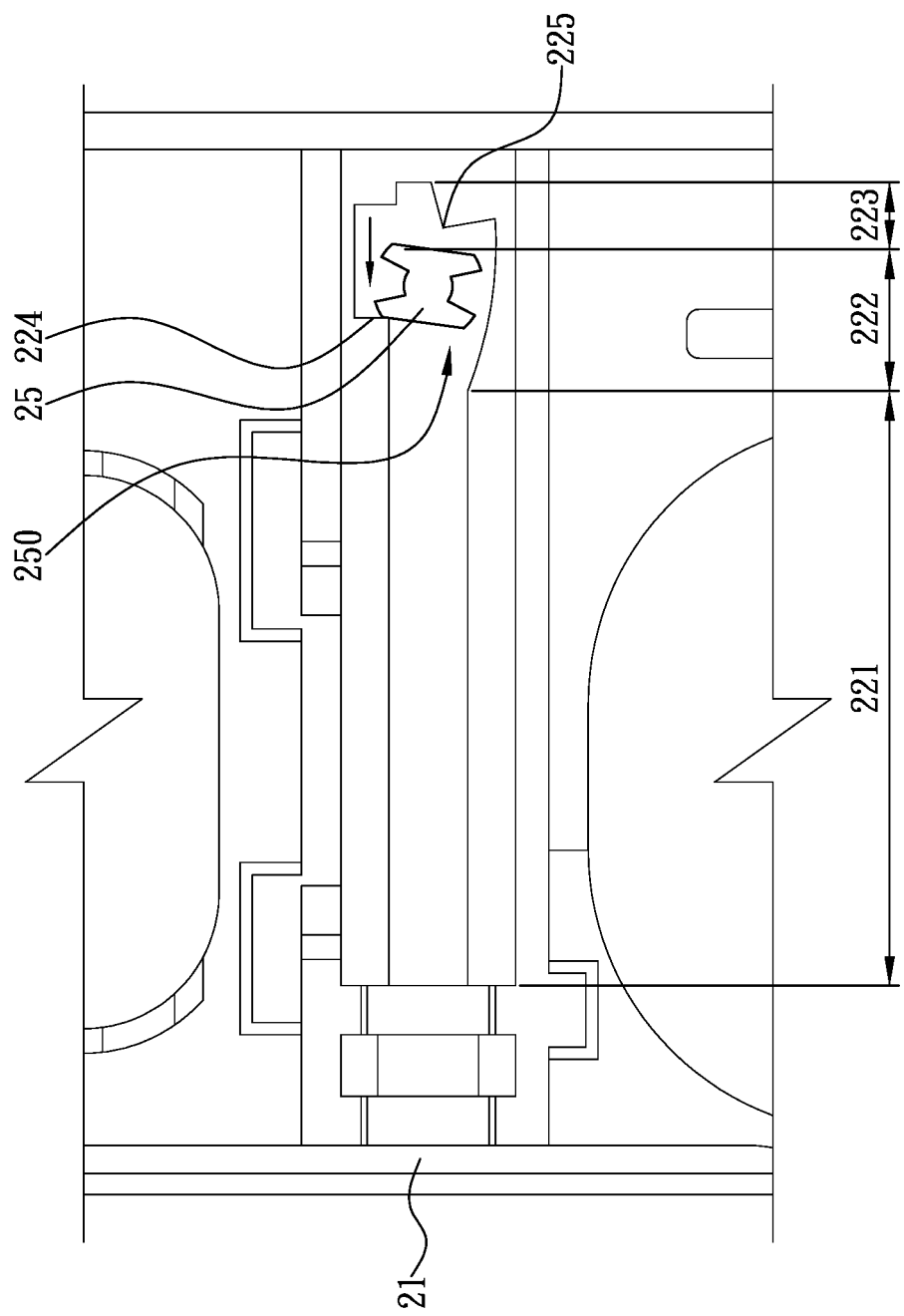
Figure 9D:
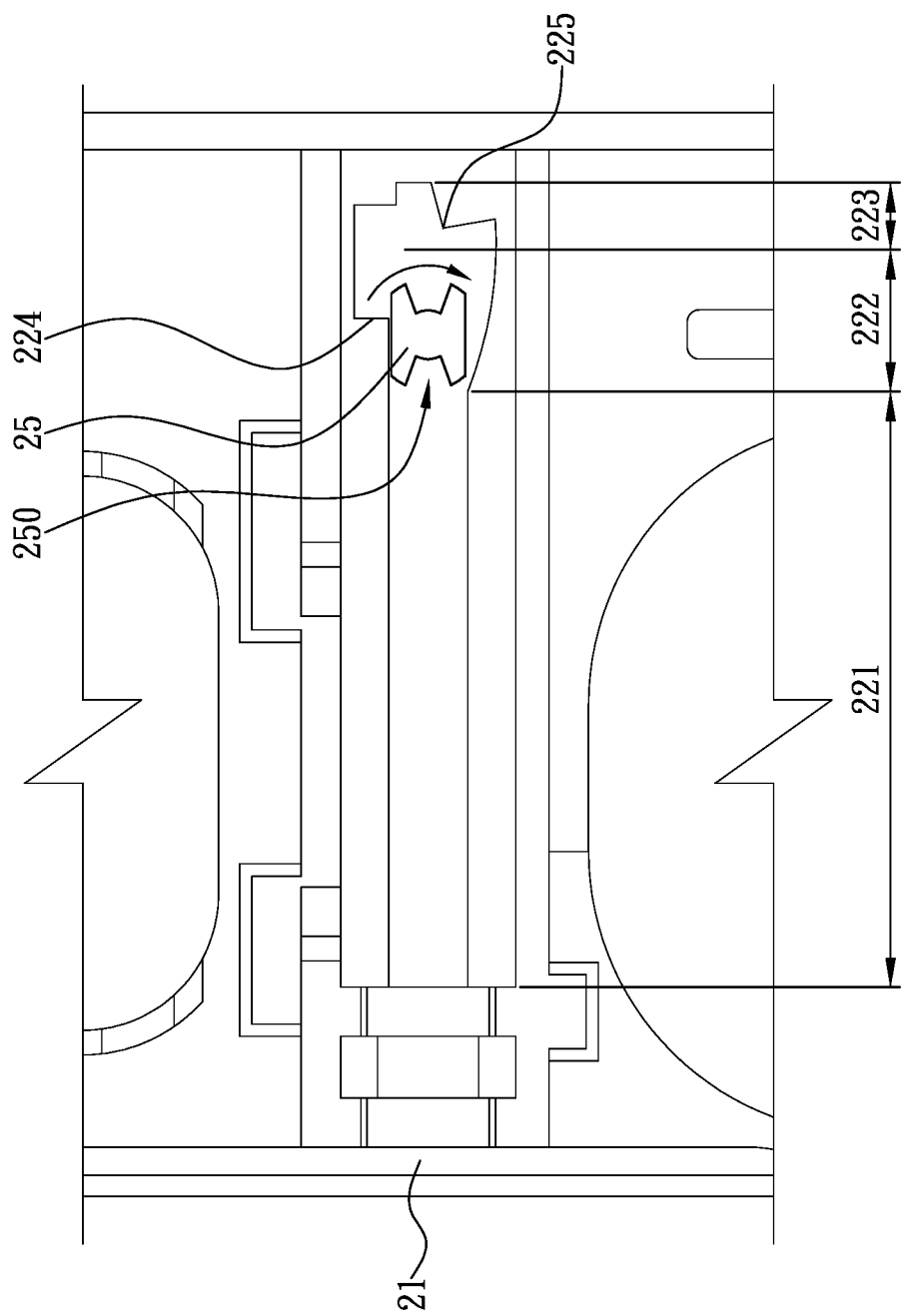

When it is desired to use the cigar cutter 2, the user presses the blade holder 23 once more so that the elastic element 24 is compressed again. The arresting block 25 will stay in the inclined position (with respect to the position of the arresting block 25 in FIG. 8A) and be moved from the direction-changing groove 222 toward the abutting groove 223 until touching, and obstructed by, the abutting block 225 (as shown in FIG. 9A). The obstruction causes the arresting block 25 to rotate in the rotating direction (e.g., clockwise) (as shown in FIG. 9B). Once the user's finger is released, i.e., when the blade holder 23 is no longer pressed, the blade holder 23 is moved outward by the restoring force of the elastic element 24. During the process, the arresting block 25 is moved from the abutting groove 223 toward the direction-changing groove 222 (as shown in FIG. 9C) until touching, and obstructed by, the shoulder 224, and the obstruction causes the arresting block 25 to rotate again in the rotating direction (e.g., clockwise) (as shown in FIG. 9D). After the arresting block 25 has been rotated twice, the two first opposite sides of the arresting block 25 correspond to the two opposite sides (e.g., the upper and lower sides shown in FIG. 5) of the direction-changing groove 222 respectively. As the first length H1 defined by the two first opposite sides of the arresting block 25 is equal to or less than the distance between the two opposite sides of the smooth groove 221, the arresting block 25 is allowed to extend into the smooth groove 221 (as shown in FIG. 8A), thereby rendering the cigar cutter 2 into the open state (as shown in FIG. 3).

It can be known from the above that the arresting block 25 and the guide track 22 according to the present disclosure are so designed that the cigar cutter 2 can be switched between the closed state and the open state by the user pressing the blade holder 23 repeatedly. After using the cigar cutter 2, therefore, the user can easily keep the cigar cutter 2 in the closed state and store the cigar cutter 2 in a pocket or bag. The convenience and safety of use of the cigar cutter 2 are thus greatly enhanced in comparison with the prior art. Further, as the second length H2 defined by the two second opposite sides of the arresting block 25 is greater than the first length H1 defined by the two first opposite sides of the arresting block 25, the longitudinal distance between the two opposite sides (e.g., the upper and lower sides shown in FIG. 5) of the direction-changing groove 222 is greater than the longitudinal distance between the two opposite sides (e.g., the upper and lower sides shown in FIG. 5) of the smooth groove 221 in order to provide a sufficiently large space in which the arresting block 25 can rotate.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A cigar cutter with an arresting mechanism, comprising:
    a main body formed with at least one through hole and provided therein with a guide track extending in a transverse direction and being divided at least into a smooth groove, a direction-changing groove, and an abutting groove, wherein one end of the direction-changing groove is in communication with an end of the smooth groove, and the other end of the direction-changing groove is in communication with an end of the abutting groove, one side of the direction-changing groove has a shoulder, a side of the abutting groove that is opposite to the shoulder is formed with an abutting block, and a portion of the abutting block corresponds to a space between two opposite sides of the smooth groove;
    a blade holder configured to be movably engaged to the main body, having one side configured to be exposed from the main body and the other side configured to extend into the main body, having at least one first blade located on the blade holder, and configured to be displaced along a direction inward of the main body so that the at least one first blade covers the at least one through hole and the cigar cutter enters a closed state;
    at least one elastic element, located in the main body, having one end configured to abut against the blade holder and the other end configured to abut against the main body, and configured to be compressed when the blade holder is displaced along the direction inward of the main body, and to push the blade holder away from the main body and the at least one first blade away from covering the at least one through hole so that the cigar cutter enters an open state; and
    an arresting block having two first opposite sides, two second opposite sides that are other than the two first opposite sides, a first length between the two first opposite sides, and a second length defined as a maximum distance between the two second opposite sides, wherein the first length is equal to or less than a distance between the two opposite sides of the smooth groove, the second length is greater than the distance between the two opposite sides of the smooth groove, and the arresting block is configured to:
    be pivotally connected to the blade holder;
    be extended into the guide track;
    move in the guide track along with the displacement of the blade holder;
    when the cigar cutter is in the open state, be located in the smooth groove with the two first opposite sides of the arresting block corresponding to the two opposite sides of the smooth groove, respectively;
    when the blade holder is pressed and the at least one elastic element is compressed, move from the smooth groove along a direction toward the abutting groove until touching the abutting block;
    rotate in a rotating direction in response to touching the abutting block;
    when the blade holder is not pressed and the blade holder is moved by a restoring force of the at least one elastic element, move along a direction from the abutting groove toward the direction-changing groove until touching the shoulder; and
    in response to touching the shoulder, rotate in the rotating direction to enable the two second opposite sides of the arresting block to correspond to two opposite sides of the direction-changing groove respectively and to keep the two second opposite sides of the arresting block from being extended into the smooth groove, so that the cigar cutter remains in the closed state.

2. The cigar cutter according to claim 1, the arresting block is further configured to:
    when the cigar cutter is in the closed state, the blade holder is pressed, and the at least one elastic element is compressed, move along a direction from the direction-changing groove toward the abutting groove until touching the abutting block;
    rotate in the rotating direction in response to touching the abutting block;
    when the blade holder is not pressed and the blade holder is moved by a restoring force of the at least one elastic element, move along the direction from the abutting groove toward the direction-changing groove until touching the shoulder; and
    in response to touching the shoulder, rotate in the rotating direction to enable the two first opposite sides of the arresting block to correspond to the two opposite sides of the direction-changing groove respectively and to extend into the smooth groove, so that the cigar cutter is in the open state.

3. The cigar cutter according to claim 2, wherein a longitudinal distance between the two opposite sides of the direction-changing groove is greater than a longitudinal distance between the two opposite sides of the smooth groove.

4. The cigar cutter according to claim 2, the main body comprising:
    a housing formed on one side thereof with at least one receiving opening allowing a side of the blade holder and the at least one first blade to extend therethrough into the main body, wherein the guide track is provided within the housing;
    a front cover configured to be mounted on the front side of the housing and formed with at least one front through hole; and
    a rear cover configured to be mounted on the rear side of the housing and formed with at least one rear through hole, wherein the at least one front through hole and the at least one rear through hole form the at least one through hole.

5. The cigar cutter according to claim 2, further comprising a second blade disposed in the main body, wherein the second blade corresponds in position to the at least one first blade.

6. The cigar cutter according to claim 1, wherein each of the two second opposite sides of the arresting block is inwardly formed with a recess.

7. The cigar cutter according to claim 6, wherein a longitudinal distance between the two opposite sides of the direction-changing groove is greater than a longitudinal distance between the two opposite sides of the smooth groove.

8. The cigar cutter according to claim 6, the main body comprising:

a housing formed on one side thereof with at least one receiving opening allowing a side of the blade holder and the at least one first blade to extend therethrough into the main body, wherein the guide track is provided within the housing;

a front cover configured to be mounted on the front side of the housing and formed with at least one front through hole; and a rear cover configured to be mounted on the rear side of the housing and formed with at least one rear through hole, wherein the at least one front through hole and the at least one rear through hole form the at least one through hole.

9. The cigar cutter according to claim 6, further comprising a second blade disposed in the main body, wherein the second blade corresponds in position to the at least one first blade.

10. The cigar cutter according to claim 1, wherein the rotating direction is clockwise.

11. The cigar cutter according to claim 1, wherein a longitudinal distance between the two opposite sides of the direction-changing groove is greater than a longitudinal distance between the two opposite sides of the smooth groove.

12. The cigar cutter according to claim 1, the main body comprising:

a housing formed on one side thereof with at least one receiving opening allowing a side of the blade holder and the at least one first blade to extend therethrough into the main body, wherein the guide track is provided within the housing;

a front cover configured to be mounted on the front side of the housing and formed with at least one front through hole; and a rear cover configured to be mounted on the rear side of the housing and formed with at least one rear through hole, wherein the at least one front through hole and the at least one rear through hole form the at least one through hole.

13. The cigar cutter according to claim 1, further comprising a second blade disposed in the main body, wherein the second blade corresponds in position to the at least one first blade.

* * * * *